US012367458B2

United States Patent
Turner et al.

(10) Patent No.: US 12,367,458 B2
(45) Date of Patent: Jul. 22, 2025

(54) METHOD AND APPARATUS FOR LOGISTICS MANAGEMENT USING QUANTUM COMPUTING

(71) Applicant: ENTANGLEMENT, INC., Miami, FL (US)

(72) Inventors: Jason Turner, New York, NY (US); William J. Haynes, II, Maryville, TN (US); Christopher A. Wiklof, Everett, WA (US)

(73) Assignees: Entanglement, Inc., Miami, LA (US); William J. Haynes, II, Maryville, TN (US)

( * ) Notice: Subject to any disclaimer, the term of this patent is extended or adjusted under 35 U.S.C. 154(b) by 0 days.

(21) Appl. No.: 18/250,040

(22) PCT Filed: Oct. 25, 2021

(86) PCT No.: PCT/US2021/056503
§ 371 (c)(1),
(2) Date: Apr. 22, 2023

(87) PCT Pub. No.: WO2022/087535
PCT Pub. Date: Apr. 28, 2022

(65) Prior Publication Data
US 2024/0394653 A1 Nov. 28, 2024

Related U.S. Application Data

(60) Provisional application No. 63/104,971, filed on Oct. 23, 2020.

(51) Int. Cl.
*G06Q 10/087* (2023.01)
*G06N 10/60* (2022.01)

(52) U.S. Cl.
CPC ........... *G06Q 10/087* (2013.01); *G06N 10/60* (2022.01)

(58) Field of Classification Search
CPC ...... G06Q 10/087; G06Q 10/08; G06N 10/60; G06N 5/01
See application file for complete search history.

(56) References Cited

U.S. PATENT DOCUMENTS

| | | | |
|---|---|---|---|
| 7,941,236 B2 * | 5/2011 | Spearman | G06Q 10/06 705/28 |
| 8,655,705 B2 * | 2/2014 | Riepshoff | G06Q 10/087 705/348 |

(Continued)

OTHER PUBLICATIONS

"Multi-itinerary Optimization as Cloud Service (Industrial Paper)",SIGSPATIAL '19: Proceedings of the 27th ACM SIGSPATIAL International Conference on Advances in Geographic Information Systems, Nov. 2019. (Year: 2019).*

(Continued)

*Primary Examiner* — Michael Jared Walker
(74) *Attorney, Agent, or Firm* — Sheppard Mullin Richter & Hampton LLP (57) ABSTRACT

A computer method and system for optimizing distribution of supply items from a plurality of inventory locations to a plurality of demand locations includes, with a server computer, obtaining inventory and demand data and establishing a quadratic unconstrained binary optimization (QUBO) problem corresponding to the distribution. Data corresponding to the QUBO problem is transferred to a quantum computer for solution. The QUBO solution is converted, by the server computer, to instructions corresponding to optimized item transfer, and displaying the instructions on electronic displays of networked devices. Computer methods may include selecting a solver computer program appropriate for problem complexity. Computer methods may (Continued)

include selecting a quantum computer, quantum-inspired computer, or computer array appropriate for solution.

22 Claims, 8 Drawing Sheets

(56) References Cited

U.S. PATENT DOCUMENTS

| | | | | |
|---|---|---|---|---|
| 9,068,852 | B2* | 6/2015 | Mason | G06Q 10/047 |
| 10,760,914 | B2* | 9/2020 | Tajammul | G06F 3/0481 |
| 10,922,646 | B1* | 2/2021 | Humair | G06Q 10/087 |
| 2005/0222887 | A1* | 10/2005 | Mohan | G06Q 10/06 705/7.25 |
| 2007/0124009 | A1* | 5/2007 | Bradley | G06Q 20/203 700/99 |
| 2011/0173034 | A1* | 7/2011 | Riepshoff | G06Q 10/06316 705/7.26 |
| 2012/0323633 | A1* | 12/2012 | Chowdhary | G06Q 10/087 705/7.31 |
| 2013/0144745 | A1* | 6/2013 | Henderson | G06Q 10/06 705/26.2 |
| 2014/0019471 | A1* | 1/2014 | Linton | G05B 19/418 707/759 |
| 2014/0025295 | A1* | 1/2014 | Paul | G06Q 10/047 701/527 |
| 2014/0156472 | A1* | 6/2014 | Stuntebeck | G06Q 10/087 705/28 |
| 2017/0206481 | A1* | 7/2017 | Cheeran | G06F 3/0482 |
| 2020/0210947 | A1* | 7/2020 | Devarakonda | G06Q 10/06312 |
| 2020/0271463 | A1* | 8/2020 | Lear | G01C 21/343 |
| 2022/0076366 | A1* | 3/2022 | Mandal | G01C 21/26 |
| 2022/0122030 | A1* | 4/2022 | Kim | G06Q 30/0639 |
| 2022/0414518 | A1* | 12/2022 | You | G06Q 10/04 |

OTHER PUBLICATIONS

Retrieved on Dec. 22, 2021, from<URL: https://www.microsoft.com/en-us/research/uploads/prod/2019/ (Year: 2019).*

Cristian et al., "Multi-Itinerary Optimization as Cloud Service (Industrial Paper)", SIGSPATIAL '19: Proceedings of the 27th ACM SIGSPATIAL International Conference on Advances in Geographic Information Systems, Nov. 5-8, 2019, <URL: https://www.microsoft.com/en-us/research/uploads/prod/2019/10/MIO_Bing-11.pdf>, 10 pages.

Zhang et al.,"A Coordinated Location-Inventory Problem in Closed-Loop Supply Chain", Transportation Research Part B: Methodological, vol. 89, Jul. 2016, <URL:https://www.sciencedirect.com/science/article/pii/S0191261516301904>, 34 pages.

* cited by examiner

METHOD AND APPARATUS FOR LOGISTICS MANAGEMENT USING QUANTUM COMPUTING

CROSS-REFERENCE TO RELATED APPLICATIONS

The present application claims priority benefit from U.S. Provisional Patent Application No. 63/104,971, entitled "METHOD AND APPARATUS FOR LOGISTICS MANAGEMENT USING QUANTUM COMPUTING," filed Oct. 23, 2020, which, to the extent not inconsistent with the disclosure herein, is incorporated by reference.

BACKGROUND

Real world logistics problems are among the most complex problems routinely encountered in physical transportation and supply chains. Because of the complexity of such problems, physical distribution, delivery and transportation tend to operate according to fixed schedules and routes that remain constant regardless of instantaneous supply and demand.

What is needed is a technology for quickly computing distribution, delivery, and transportation dynamically to respond to dynamic aspects of supply and demand.

SUMMARY

According to an embodiment, a computer method for managing a supply chain includes receiving, into a server computer, an inventory of one or more supply items located at each of a plurality of different inventory locations, and loading a demand for the one or more supply items corresponding to each of a plurality of different demand locations. The server computer obtains map data corresponding to delivery routes between the inventory locations and the demand locations. The server computer obtains delivery resource information for delivery from the inventory locations to the demand locations. The server computer establishes a quadratic unconstrained binary optimization (QUBO) problem describing the system including the inventory of supply items at the plurality of inventory locations, the demand at each of the demand locations, the map data, and the delivery resources to solve for a flow of supply items between the inventory locations and the demand locations. The server computer transfers data corresponding to the QUBO problem to a quantum computer. The server computer receives, from the quantum computer, a solution to the QUBO problem and converts the QUBO solution to a flow of supply items by transforming a plurality of solution binary values into corresponding flows of real supply items. The server computer converts the flow of supply items to a plurality of pick lists for transport of the one or more supply items from the inventory locations to the demand locations and outputs, via an electronic display on at least one of a plurality of networked devices, at least one of the plurality of pick lists and delivery routes. For example, the one or more supply items may include personal protective equipment (PPE), ventilators, drug(s), and/or vaccine(s) used in support of our battle against the SARS COV-2 virus and COVID-19.

According to an embodiment, a computer method for using a quantum or quantum-inspired computer for solving a constrained logistics optimization problem includes receiving a logistics problem description, from a user via a graphical user interface displayed on an electronic display of a networked user computing device, into a server computer, estimating, with the server computer, a logistics problem solution complexity corresponding to the logistics problem, and determining if the logistics problem solution complexity is appropriate for solution by transformation to a quadratic unconstrained binary optimization (QUBO) problem. The computer method may further include establishing a QUBO problem, selecting a quantum or quantum-inspired computer or computer array for solving the QUBO problem, the selection being based upon solution complexity. The method may include transferring, to the selected quantum or quantum-inspired computer or computer array, data corresponding to the QUBO problem, and after solution by the quantum computer, receiving, from the selected quantum or quantum-inspired computer or computer array into the server computer, a solution to the QUBO problem. The method may include converting, in the server computer, the QUBO solution to a flow of supply items by transforming a plurality of solution binary values into corresponding flows of real supply items, converting, in the server computer, the flow of supply items to a plurality of pick lists for transport from the inventory locations to the demand locations; and outputting, via a GUI on an electronic display on at least one of a plurality of networked devices, at least one of the plurality of pick lists and delivery routes.

According to an embodiment, a computer method for using a quantum or quantum-inspired computer for solving a constrained logistics optimization problem includes receiving a logistics problem scope from a user via a graphical user interface displayed on an electronic display of a networked user computing device into a server computer, estimating, with the server computer, a logistics problem solution complexity corresponding to the logistics problem scope, and with the server computer, selecting a solver computer program appropriate for the logistics problem solution complexity. The method may include calling the selected solver computer program, driving the graphical user interface displayed on the electronic display of the networked user computing device to receive logistics problem parameters into the solver computer program, and receiving the logistics problem parameters. The method may include, with the selected solver computer program, establishing a QUBO problem. Data corresponding to the QUBO problem may be transferred to a quantum or quantum-inspired computer or computer array. After solution by the quantum or quantum-inspired computer or computer array, the method includes receiving, from the selected quantum or quantum-inspired computer or computer array into the server computer, a solution to the QUBO problem. The solution may be processed to drive a logistics system.

According to embodiments, a computer method for using a quantum or quantum-inspired computer for solving a constrained logistics optimization problem may include establishing the QUBO problem by matching the problem parameters to a QUBO model, determining a plurality of data transformations for converting real variables into binary variables, determining one or more quadratic penalty functions corresponding to one or more constraints on delivery of the supply items from the inventory locations to the demand locations, the penalty function being selected to make a quadratic binary optimization problem unconstrained, and forming a symmetric Q matrix corresponding to the QUBO model, the plurality of data transformations, and the one or more penalty functions.

DETAILED DESCRIPTION

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

The inventors developed and/or plan to develop data elements necessary to analyze COVID-19 logistics. The analysis involved correlating data from publicly available information to model demand data to a known degree of confidence. The inventors performed the following steps to create a solution:

1. Defined different resource categories (PPEs) for which we would like to perform distribution optimization (Gloves, Gowns, Masks, Respirators, Ventilators),
2. Built a demand model based upon collected demand data for the PPEs from Johns Hopkins and forecast the demand for 2 weeks into the future in accordance with the usage guidelines for PPE published on the JHU portal,
3. Created cost functions and other constraints. Some examples include available modes of transportation, power requirements for ventilators, and the utilization of existing staging centers or TCH,
4. Performed clustering on the demand regions to identify the staging centers where we can host the PPEs for distribution,
5. Performed resource allocation optimization from inventory centers to the staging centers by creating and solving a QUBO problem,
6. Performed routing optimization to route the allocated resources from inventory centers to the staging centers and subsequently from staging centers to the regions of demand, and
7. Computed efficiency metrics, focusing the use case on the state of Florida.

Figure 1:
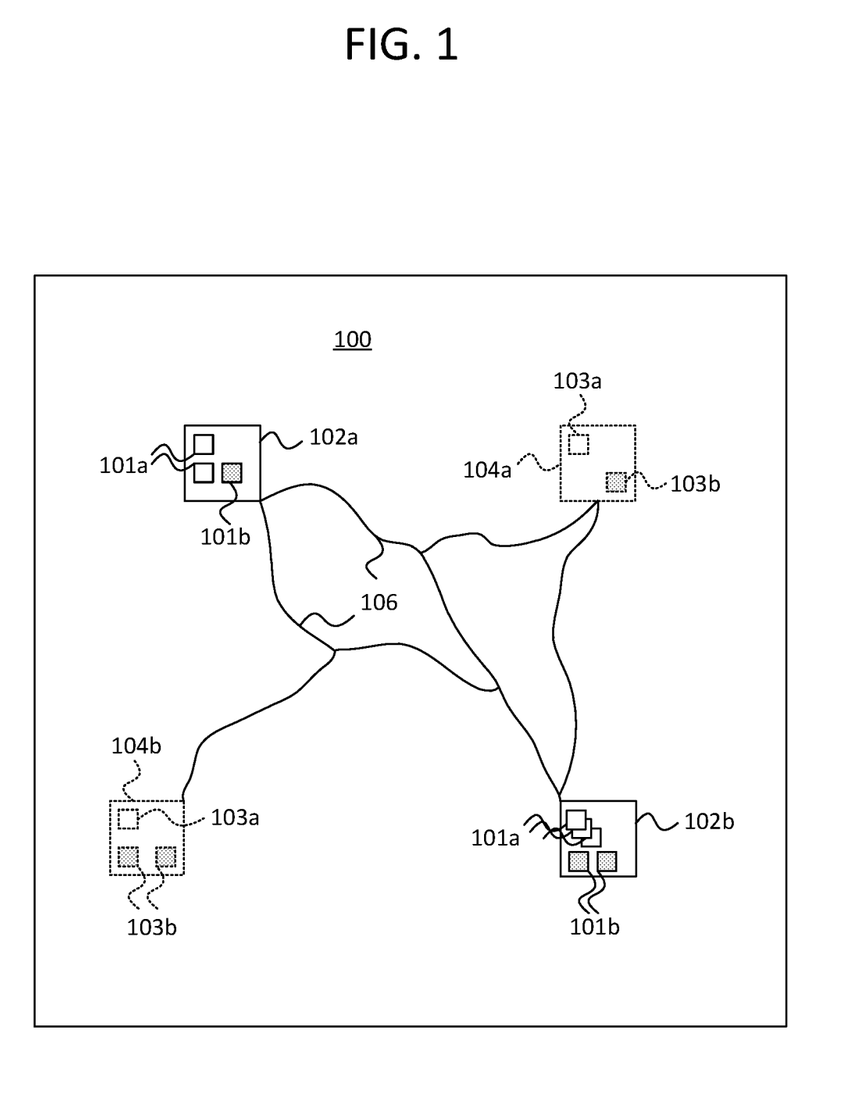
FIG. 1 is a diagram illustrative of a map of inventory locations, demand locations, and delivery routes connecting the inventory locations to the demand locations illustrative of a logistics management problem for delivery of supplies corresponding to a COVID-19 response, according to an embodiment.
Figure 2:
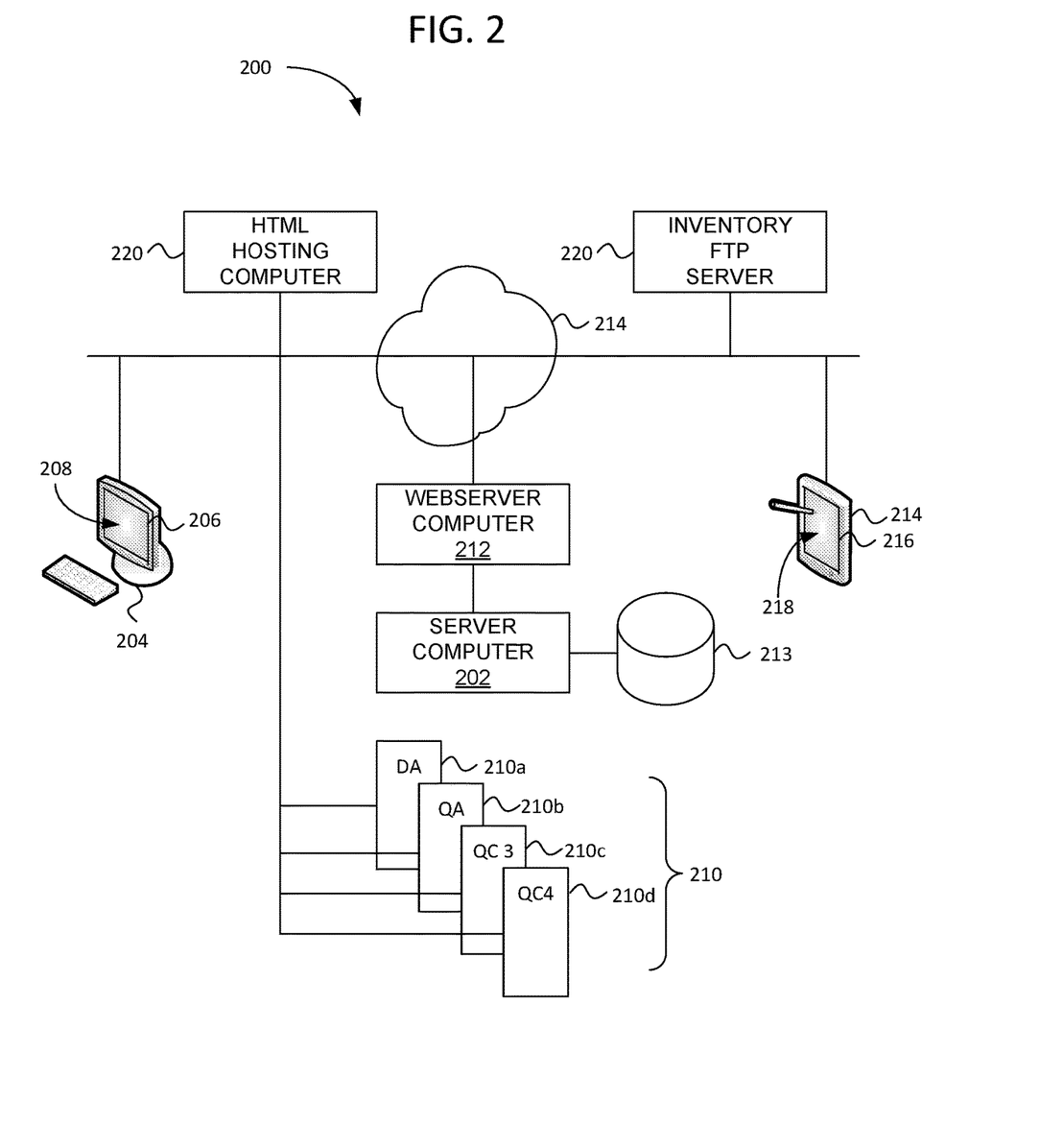
FIG. 2 is a diagram showing a computer network for computing a solution for delivery of supplies across the illustrative map of FIG. 1, according to an embodiment.
Figure 3:
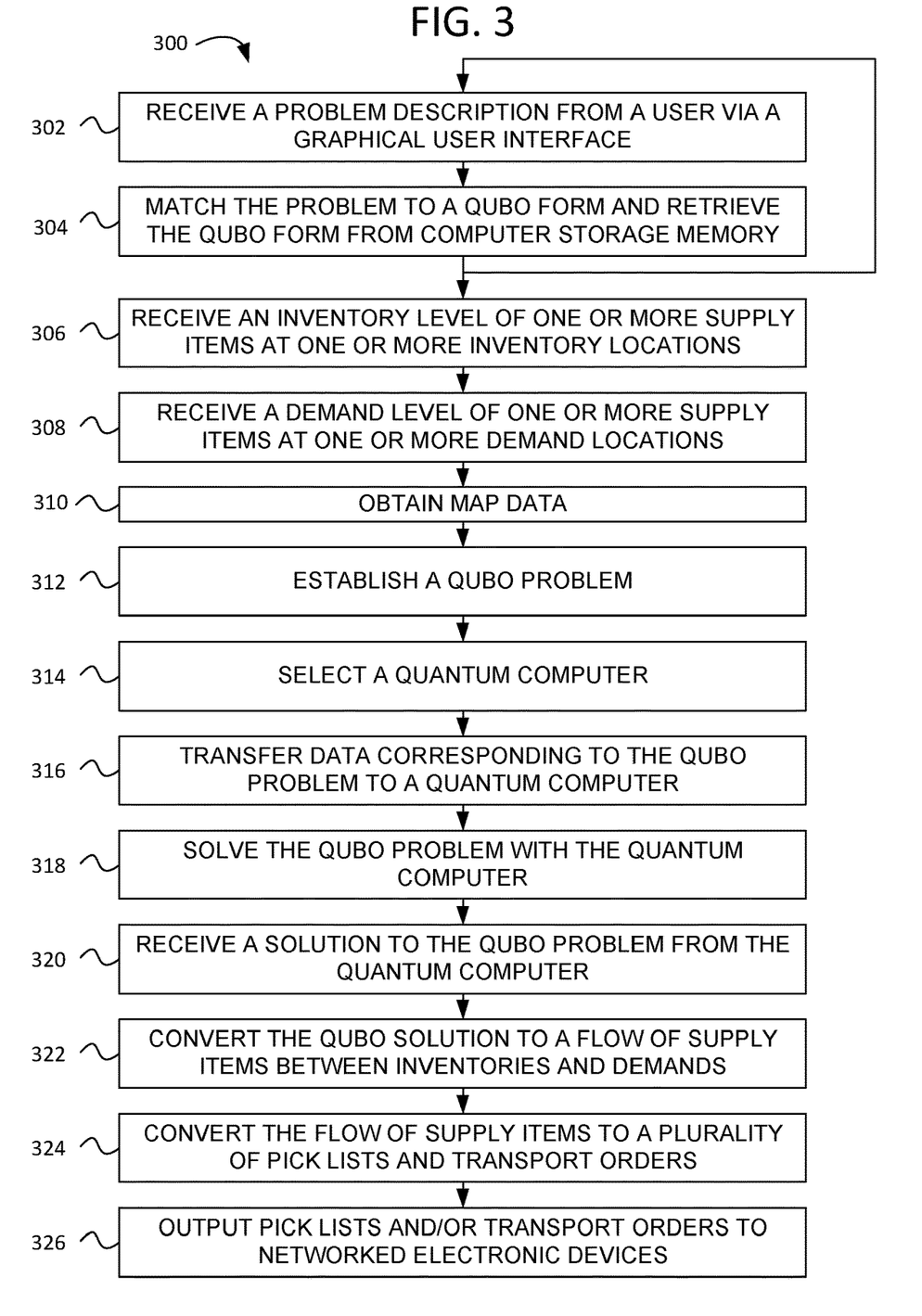
FIG. 3 is a flow chart illustrating a computer method for using the computer network of FIG. 2 to compute a solution for delivery of supplies across the illustrative map of FIG. 1, according to an embodiment.

FIG. 1 is a simplified map 100 showing inventory locations 102a, 102b, demand locations 104a, 104b, and delivery routes 106 connecting the inventory locations 102a, 102b to the demand locations 104a, 104b illustrative of a logistics management problem for delivery of supplies corresponding to a COVID-19 response, according to an embodiment. FIG. 2 is a diagram showing a computer network 200 for computing a schedule for delivery of supplies across the map 100 of FIG. 1, according to an embodiment. FIG. 3 is a flow chart illustrating a computer method 300 for using the computer network 200 of FIG. 2 to compute a schedule for delivery of supplies across the map 100 of FIG. 1, according to an embodiment.

As used herein, the terms quantum computer, quantum-inspired computer, and the like are used to simplify reference to a more granular set of computing devices that include both actual and simulated superposition gates configured to simultaneously correspond to two states. Such computers include including quantum annealing computers (e.g., D-Wave), adiabatic optimization computers, digital annealing computers (e.g., Fujitsu DA), and anthropomorphic computers. Other types of quantum and quantum-inspired computers are indicated below.

Referring to FIGS. 1, 2, and 3, in an embodiment, a server computer 202, in step 302 of the computer method 300, drives a GUI to receive a problem specification from a user. Driving the GUI may include providing a form for specifying objects, actions, relationships, variables, constraints, and objectives of the problem.

In an embodiment, the server computer 202, in step 304, uses the specified problem to match the problem specification to a Quantum Unconstrained Binary Optimization (QUBO) solution form, retrieves a QUBO template from a non-transitory computer readable storage medium 213. A QUBO solution is not necessarily limited to only unconstrained problems. Typically, a problem may include constraints. Embodiments herein include determining one or more penalty functions for converting a constrained optimization problem to an unconstrained problem appropriate for solution according to QUBO methods.

The QUBO template may include data for driving the GUI to prompt the user to enter the objects, actions, relationships, variables, constraints, and objectives specific to the problem. The computer method 300 may loop through steps 302 and 304 as entered problem data informs the server computer 202 about the QUBO template.

According to embodiments, matching the problem specification to a QUBO solution model, in step 304, may include matching to a model type selected from a Quadratic Assignment Problem, a Capital Budgeting problem, a Multiple Knapsack Problem, a Task Allocation Problem (such as for distributing QUBO solution workload across a distributed computer system), a Maximum Diversity Problem, a P-Median Problem, an Asymmetric Assignment Problem, a Symmetric Assignment Problem, a Side Constrained Assignment Problem, a Quadratic Knapsack Problem, a Constraint Satisfaction Problem (CSP), a Set Partitioning Problem, a Set Packing Problem, a Warehouse Location Problem, a Maximum Clique Problem, a Maximum Independent Set Problem, a Maximum Cut Problem, a Graph Coloring Problem, a Number Partitioning Problem, a Linear Ordering Problem, and a Clique Partitioning Problem.

Several solver software programs (software packages) for formulating a QUBO problem are available. For example AlphaQUBO™ is available from Meta-Analytics, Boulder, CO. A system from D-Wave, Barnaby, Canada is available at a Github repository as/dwavesystems/qbsolv. Tabu Search Solver is available from the organization 1Qbit, Vancouver, Canada. NGQ™ is available from Entanglement, Inc. NY, NY. In an embodiment, one or more of the solver programs may be loaded onto a server computer providing a web application to a user. In another embodiment, one or more of the solver programs may operate on separate server computers, for example as a rest application program interface (API) and/or command line interface (CLI). The server computer may control communications with the separate server computer(s).

For optimizations that are recurring, i.e., which were defined previously and which are being run again to account for changing conditions, the steps of receiving the problem description in 302 and matching the problem description to a QUBO template in step 304 may be omitted. In such a case, the user may specify a recurrence of the previous problem via the GUI 208 (either for automatic running or to initiate a new run of the previous solution, based on new information).

According to an embodiment, the method 300 includes receiving, in step 306, into the server computer 202, an inventory 101$a$, 101$b$ of one or more supply items 103$a$, 103$b$ located at each of a plurality of different inventory locations 102$a$, 102$b$. The computer method 300 continues receiving into the server computer 202, in step 308, a demand 103$a$, 103$b$ for the one or more supply items corresponding to each of a plurality of different demand locations 104$a$, 104$b$; and obtaining, with the server computer 202, in step 310, map 100 data corresponding to delivery routes 106 between the inventory locations 102$a$, 102$b$ and the demand locations 104$a$, 104$b$.

In an embodiment, steps 306 and 308 may independently include receiving at least an implied command from a user via a graphical user interface (GUI) 208 on an electronic display 206 of a networked device 204 to commence an optimization of supply item delivery, and receiving a transfer of the inventories 101$a$, 101$b$ and/or the demands 103$a$, 103$b$ into the server computer responsive to a command from the user via the GUI 208.

In an embodiment, steps 306, 308, and 310 may independently include receiving, into the server computer from a webserver computer 212 operatively coupled to one or more internetworks 214, a plurality of published values comprising at least one of the group consisting of: supply item inventories corresponding to the inventory locations, demands, map data, inventory locations, demand locations, costs, prices, storage environmental capability, cartage environmental capability, transport instance designations, transport instance locations, supply location mobility, demand location mobility, and metadata corresponding to one or more groups of persons intended to receive at least a portion of the supply items. The web server computer 212 may be operatively coupled to the Internet 214.

In an embodiment, steps 306, 308, and 310 may independently include enabling a search engine to find published variables including inventory, transportation, cache, and/or demand, and locations corresponding thereto and receiving hits from the search. Steps 306, 308, 310 may additionally independently include receiving a designation from the GUI 208 or by analyzing with artificial intelligence, of useful hits. The server computer may read the useful hit; and maintain a dynamic listing of the variables. Reading useful hits may include obtaining data via an FTP transfer. Additionally or alternatively reading useful hits includes performing screen scraping.

Proceeding to step 312, the server computer establishes a quadratic unconstrained binary optimization (QUBO) problem describing the system including the inventory of supply items at the plurality of inventory locations, the demand at each of the demand locations, and the map data, to solve for a flow of supply items therebetween. Techniques for establishing a QUBO problem are understood.

In step 312, the server computer 202 establishes values of constants in a QUBO matrix Q according to the form:

$$\text{minimize/maximize } y = x^t Q x,$$

where Q is a matrix of constants.

The values of the constants may be determined according to the QUBO form, entries from the GUI 208, quadratic penalty functions generated as a function of the problem specification, and simplifications corresponding to the QUBO form and entries from the GUI 208. For example, a real world constraint may include the fact that distributed supply items cannot exceed total inventory of supply items. This real world constraint may be converted to a quadratic binary penalty function that is inserted into the quadratic matrix Q. For the example of optimizing delivery of supply inventory from inventory locations to satisfy demands at demand locations, using routing 106 across a map 100, the locations, the inventories, the demands and other aspects are used to determine values of the constants.

In an embodiment, establishing the QUBO problem in step 312 includes establishing, with the server computer 202, a real-to-binary conversion value corresponding to supply item flow between the inventory locations and the demand locations to produce each of a plurality of binary variables selected to represent states of supply item flow for matrix processing by a quantum computer 210. Establishing a real-to-binary conversion value may include receiving an entry from a user via the GUI. For example, establishing the real-to-binary conversion value may include establishing the real-to-binary conversion value to equal a package quantity for each item.

In an embodiment, one may create staging areas for inventory items. The inventory items may be grouped and allocated based on a preferred number of staging areas.

In an embodiment, establishing the QUBO problem in step 312 includes establishing, with the server computer, at least one quadratic penalty function corresponding to at least one constraint on delivery of the supply items from the inventory locations to the demand locations, the penalty function being selected to make a quadratic binary optimization problem unconstrained.

In an embodiment, one may created cost functions and other constraints. Some examples include available modes of transportation, power requirements for ventilators, and the utilization of existing staging centers. For a given problem, the real world model may be constrained by considerations such as a need to pair electrical generators with 'x' number of ventilators. Another example constraint is a number of allowed items (by weight) per truck or mode of transportation.

The cost functions and other constraints may be used for creating penalty functions.

Establishing the QUBO problem, in step 312, may include assigning constants in a square matrix Q corresponding to the at least one quadratic penalty function.

In an embodiment, establishing a QUBO problem in step 312 includes formulating a Quadratic Assignment Problem (QAP).

Optionally, the method 300 may include step 314 where the server computer 202 receives, from the user via the GUI

208, a selection of a type of quantum computer 210*a* (e.g., a Digital Annealer), 210*b* (e.g. a Quantum Annealer), 210*c*, or 210*d* for solving the QUBO problem. Additionally or alternatively, the QUBO model or a separate table of capabilities stored in non-transitory computer readable storage memory 213 may provide a recommendation to the user via the GUI 208, or may automatically select from between quantum computers 210*a*, 210*b*, 210*c*, 210*d*, based on problem size and characteristics, and on SaaS costs for running a solution on a respective quantum computer 210*a*, 210*b*, 210*c*, 210*d*.

The server computer, in step 314, transfers data corresponding to the QUBO problem to a quantum computer 210. Various types of quantum computers are available and/or under development:

DA—Digital Annealer. Fujitsu. Hitachi has one in R&D, MIT has one in research, others may come online. Typically "Quantum Inspired"—see below A "Digital Annealer uses a digital circuit design inspired by quantum phenomena. DA is a new computer architecture that focuses on rapidly solving combinatorial optimization problems. It can solve difficult problems within several seconds that take classical computers a considerable amount of time to process." https://www-.topcoder.com/lp/digitalannealer CMOS Annealer:
https://www.hitachi.com/rd/glossary/c/cmos_annealing.html QA-Quantum Annealing (https://en.wikipedia.org/wiki/Quantum_annealing) or Adiabatic Quantum Computation (https://en.wikipedia.org/wiki/Adiabatic_quantum_computation)

D-Wave

Research with NTT, https://ntt-research.com/community/a-quantum-annealer-with-fully-programmable-all-to-all-coupling-via-floquet-engineering-was-submitted-to-arxiv/

Neuromorphic Computing—mimics the human brain (https://en.wikipedia.org/wiki/Neuromorphic_engineering)

Intel

IBM

University of Manchester (SpinNaker)

Rain Neuromorphics (www.rain.ai)

NeuroMem (www.general-vision.com)

https://labs.sciences.ncsu.edu/appliedchaoslab/william-ditto-phd/QC:

Quantum Computing/Quantum Computer (https://en.wikipedia.org/wiki/Quantum_computing)

Superconductive:

Rigetti Computing

IBM

Google

Ion-Trap

IonQ

ColdQuanta

Honeywell

Alpine Quantum (AQT)

Photonic

PsiQuantum (fully fault tolerant)

Xanadu

Quantum Dot

Intel

Toplogical (purely theoretical, R&D)

Microsoft

AI Hardware Accelerators—purpose built ASICs, FPGA, or processors

Cerebras (chip is the size of a 12.9" iPad)

Groq (incredible framework)

NVIDIA

Habana Labs (acquired by Intel)

SambaNova

GraphCore

LookDynamics (photonic based)

In some embodiments, quantum-inspired hardware extends to artificial intelligence hardware accelerators such as Tensor Processors.

Some types of quantum computers, particularly quantum-inspired computers such as digital annealers, have been or are in the process of being reduced to a chip, such as an ASIC or FPGA, for example. It will be understood that step 316 may include parsing of data to a chip-level quantum computer, which may, for example, be disposed in a circuit on a PCI board or blade.

According to an embodiment, the method 300 may include step 318, including solving, with the quantum computer, the QUBO problem corresponding to the transferred data. Solving the QUBO problem with the quantum computer may include solving the QUBO problem with a quantum annealing computer 210*b*. Alternatively, solving the QUBO problem with the quantum computer may include solving the QUBO problem with a digital annealing computer 210*a*.

Proceeding to step 320, the server computer receives a solution to the QUBO problem from the quantum computer.

Proceeding to step 322, the server computer converts the QUBO solution to a flow of supply items by transforming a plurality of solution binary values xi into corresponding flows of supply items.

In step 324, the server computer converts the flow of supply items to a plurality of pick lists for transport from the inventory locations to the demand locations. In step 326, the server computer drives output, via an electronic display on at least one of a plurality of networked devices, at least one of the plurality of pick lists and delivery routes. Step 326 may additionally or alternatively include outputting data to drive automated picking and/or indication equipment.

Figure 4:
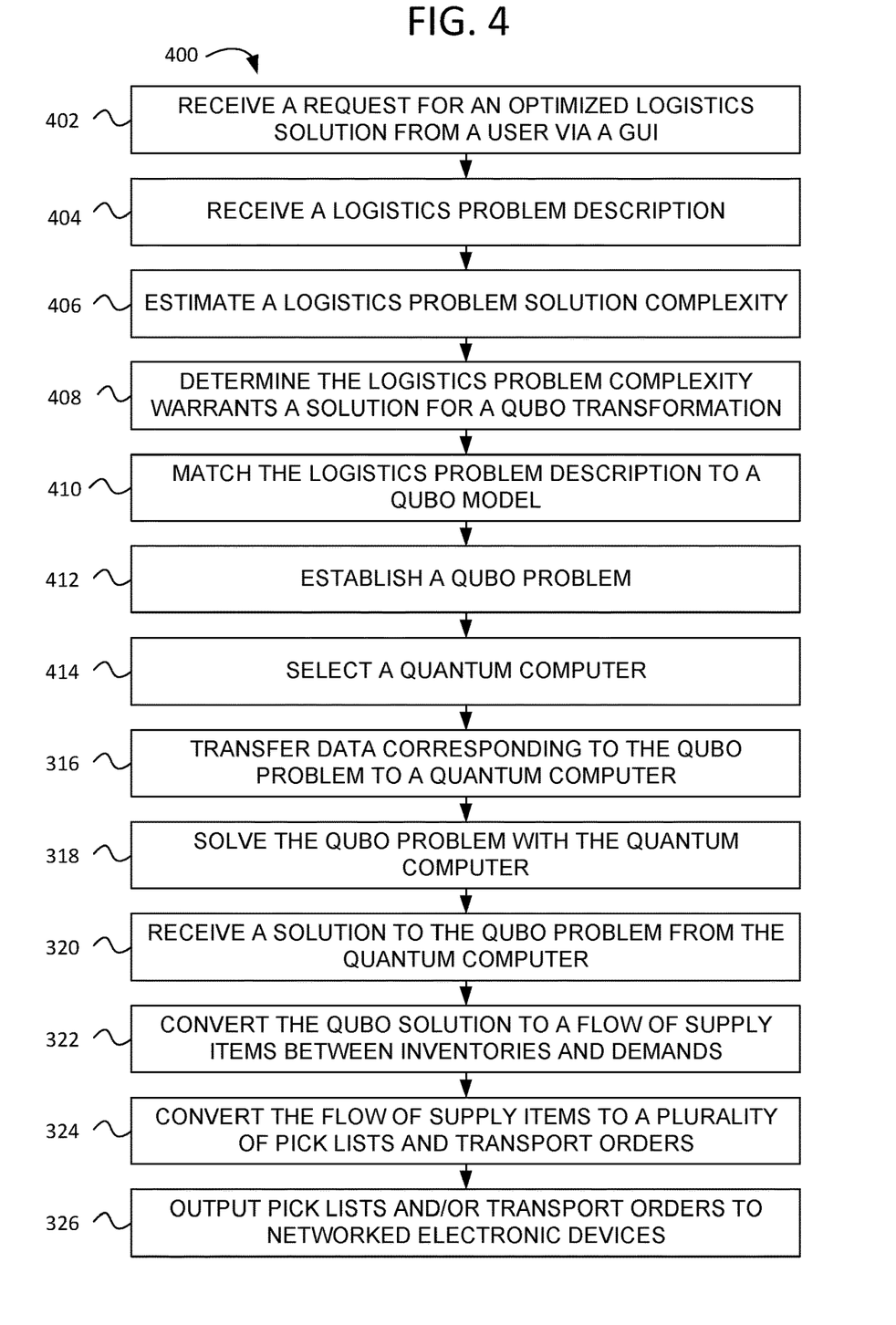
FIG. 4 is a flow chart illustrating a computer method for using a quantum or quantum-inspired computer for solving a constrained logistics optimization problem, according to an embodiment.

FIG. 4 is a flow chart illustrating a computer method 400 for using a quantum or quantum-inspired computer for solving a constrained logistics optimization problem, according to an embodiment. In step 404, a a logistics problem description may be received, such as from a user via a graphical user interface displayed on an electronic display of a networked user computing device, into a server computer. Step 406 includes estimating, with the server computer, a logistics problem solution complexity corresponding to the logistics problem. In step 408, the server computer may determine the logistics problem solution complexity is appropriate for solution by transformation to a quadratic unconstrained binary optimization (QUBO) problem. If the server computer determines the logistics problem complexity is sufficiently low to solve using classical optimization approaches, the server computer may link to a classical solver, or may display a message to the user that the problem may be better suited to a classical optimization solution.

Proceeding to step 412, a QUBO problem is established. Approaches for establishing a QUBO problem are described elsewhere herein.

Step 414 may include selecting a quantum or quantum-inspired computer or computer array for solving the QUBO problem, the selection being based upon solution complexity. The method may then proceed according to remaining steps described above in conjunction with FIG. 3. For example, step 316 may include transferring, to the selected quantum or quantum-inspired computer or computer array, data corresponding to the QUBO problem. Following solution by the selected quantum or quantum-inspired computer or computer array, the method proceeds to step 320, which includes receiving, from the selected quantum or quantum-inspired computer or computer array into the server computer, a solution to the QUBO problem. Step 322 may include converting, in the server computer, the QUBO solution to a flow of supply items by transforming a plurality of solution binary values into corresponding flows of real supply items. This may be done by running the reverse of a conversion from real to binary variables performed in conjunction with step 412. Proceeding to step 324, the server computer may convert the flow of supply items to a plurality of pick lists for transport from the inventory locations to the demand locations, followed by causing output, via a GUI on an electronic display on at least one of a plurality of networked devices, at least one of the plurality of pick lists and delivery routes at each of a plurality of inventory or staging locations.

In an embodiment, receiving the logistics problem description into the server computer in step 404 includes receiving, into the server computer, inventory data corresponding to one or more supply items located at each of a plurality of different inventory locations, receiving demand data corresponding to a demand for the one or more supply items at each of a plurality of different demand locations, and obtaining, with the server computer, delivery data corresponding to delivery between the inventory locations and the demand locations. According to embodiments, the inventory data, demand data, and delivery data constitute the logistics problem description.

In an embodiment, receiving the logistics problem description into the server computer in step 404 includes receiving a specification of one or more internetwork addresses for obtaining the specification of the supply items, receiving a specification of one or more internetwork addresses for obtaining the plurality of different inventory locations, receiving a specification of one or more internetwork addresses for obtaining the plurality of different demand locations and demand for the one or more supply items, and receiving a specification of one or more internetwork addresses for obtaining delivery data corresponding to delivery between the inventory locations and the demand locations. In such an embodiment, receiving the logistics problem description into the server computer in step 404 further includes querying each of the specified internetwork addresses for the specification of the one or more supply items, plurality of different inventory locations, the demand locations and demand for the one or more supply items, and the delivery data.

In an embodiment, receiving the logistics problem description into the server computer in step 404 includes receiving a designation of a previously defined problem description.

In an embodiment, estimating the logistics problem solution complexity corresponding to the logistics problem in step 406 includes receiving, from the user via the graphical user interface, at least a number of inventory locations, at least a number of demand locations, and at least a number of inventory items for delivery from the inventory locations to the demand locations. Step 406 may further include estimating a number of degrees of freedom, a number of variables, or a number of degrees of freedom and a number of variables for solution. Step 408 may include comparing the estimated number of degrees of freedom and/or variables to a probable solution time using a classical optimization solution. Determining the logistics problem solution complexity is appropriate for solution by transformation to a quadratic unconstrained binary optimization (QUBO) problem using a qubit computer in step 408 may be performed if the solution time using a classical optimization strategy is greater than a selected threshold.

Figure 5:
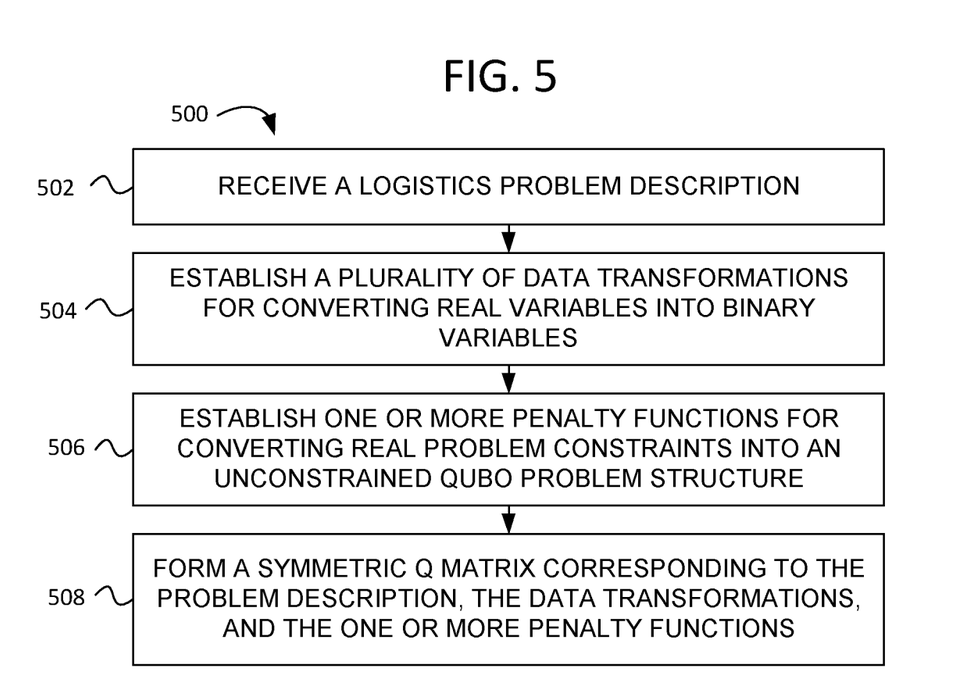
FIG. 5 is a flow chart illustrating a computer method for establishing the QUBO problem in the method of FIG. 4, according to an embodiment.

FIG. 5 is a flowchart illustrating a computer method 500 for establishing the QUBO problem in step 412 of FIG. 4, such as by using a solver computer program, according to an embodiment. In step 502, the logistics problem description is received. The method corresponding to step 412 may include, in step 504, determining a plurality of data transformations for converting real variables to binary variables. Step 506 includes determining one or more penalty functions for converting real problem constraints to an unconstrained QUBO problem structure. Step 508 includes forming a symmetric Q matrix corresponding to the problem description.

Referring again to FIG. 4, the method 400 may optionally include, with the server computer, selecting a solver computer program appropriate for the logistics problem complexity. This may include estimating a QUBO problem size corresponding to the problem description and selecting one solver computer program appropriate for the problem size from a plurality of solver computer programs, the selected solver computer program being selected to establish the QUBO problem in step 412.

The method 400 may further include, in step 410, matching the logistics problem description to a QUBO model. The matched QUBO model from step 410 may be used to select one solver computer program appropriate for the QUBO model from a plurality of solver computer programs, the selected solver computer program being selected to establish the QUBO problem.

Matching the problem description to the QUBO model in step 410 may include transmitting the problem description to a second server computer for running a selected solver program. In this case establishing the QUBO problem in step 412 includes receiving the QUBO problem from the second server computer as output from the selected solver program.

In an embodiment, establishing the QUBO problem in step 412 includes, in step 504, establishing, with the server computer, a real-to-binary conversion value corresponding to supply item flow between the inventory locations and the demand locations to produce each of a plurality of binary variables selected to represent states of supply item flow for matrix processing by a quantum computer; and in step 506, establishing, with the server computer, at least one quadratic penalty function corresponding to at least one constraint on delivery of the supply items from the inventory locations to the demand locations, the penalty function being selected to make a quadratic binary optimization problem unconstrained.

In an embodiment, matching the problem to a QUBO solution model in step 410 includes matching the problem to a Quadratic Assignment Problem (QAP). The method 400 may further include, in step 402, receiving, from the user device via a graphical user interface (GUI), into the server computer, a request for an optimization solution. The request for the optimization solution may include at least a number of the supply items, at least a number of different inventory locations, and at least a number of different demand locations. The numbers of supply items, different inventory locations, and number of different demand locations may be used to estimate the logistics problem complexity in step 406. This may be used, in some embodiments, in lieu of receiving the actual specified items, inventory locations, and demand locations for performing step 406.

Figure 6:
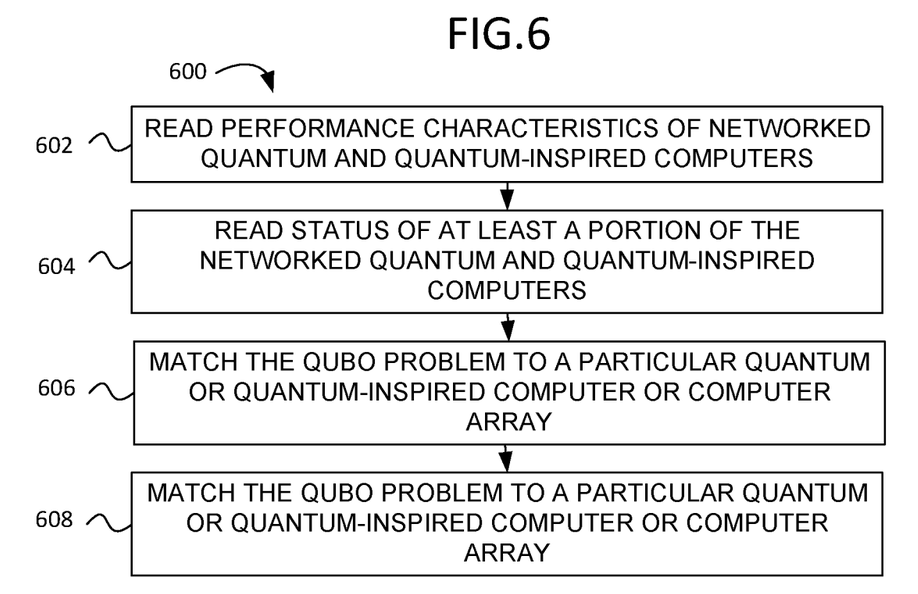
FIG. 6 is a flow chart showing a computer method for selecting a networked quantum or quantum-inspired computer or computer array for solution of the QUBO problem, according to an embodiment.

FIG. 6 is a flow chart showing a computer method 600 for selecting a networked quantum or quantum-inspired computer or computer array for solution of the QUBO problem in step 414, according to an embodiment. Step 414 may include, in step 602, reading performance characteristics of networked quantum and quantum-inspired computers, and, in step 606 matching the QUBO problem to a particular quantum or quantum-inspired computer or computer array in step 604. In step 608, the particular matched quantum or quantum-inspired computer or computer array is selected for solution. Accordingly, transferring data corresponding to the QUBO problem to a quantum computer in step 416 may include transferring data corresponding to the QUBO problem to the selected quantum or quantum-inspired computer or computer array. Similarly, receiving, from the quantum computer into the server computer, the solution to the QUBO problem in step 418 may include receiving the solution to the QUBO problem from the selected quantum or quantum-inspired computer or computer array.

Reading the performance characteristics in step 602 may include reading computation cost. Thus, matching the QUBO problem to a particular quantum or quantum-inspired computer or computer array may includes selecting the lowest computation cost quantum or quantum-inspired computer or computer array compatible with the QUBO problem. In an embodiment, reading the performance characteristics includes reading computation performance so that matching the QUBO problem to a particular quantum or quantum-inspired computer or computer array includes selecting the lowest performance quantum or quantum-inspired computer or computer array compatible with the QUBO problem.

The method 600 may also include, in step 604, reading a status of at least a portion of the networked quantum and quantum-inspired computers and computer arrays. Matching the QUBO problem to a particular quantum or quantum-inspired computer or computer array may include selecting a quantum or quantum-inspired computer or computer array having availability for receiving the QUBO problem.

Figure 7:
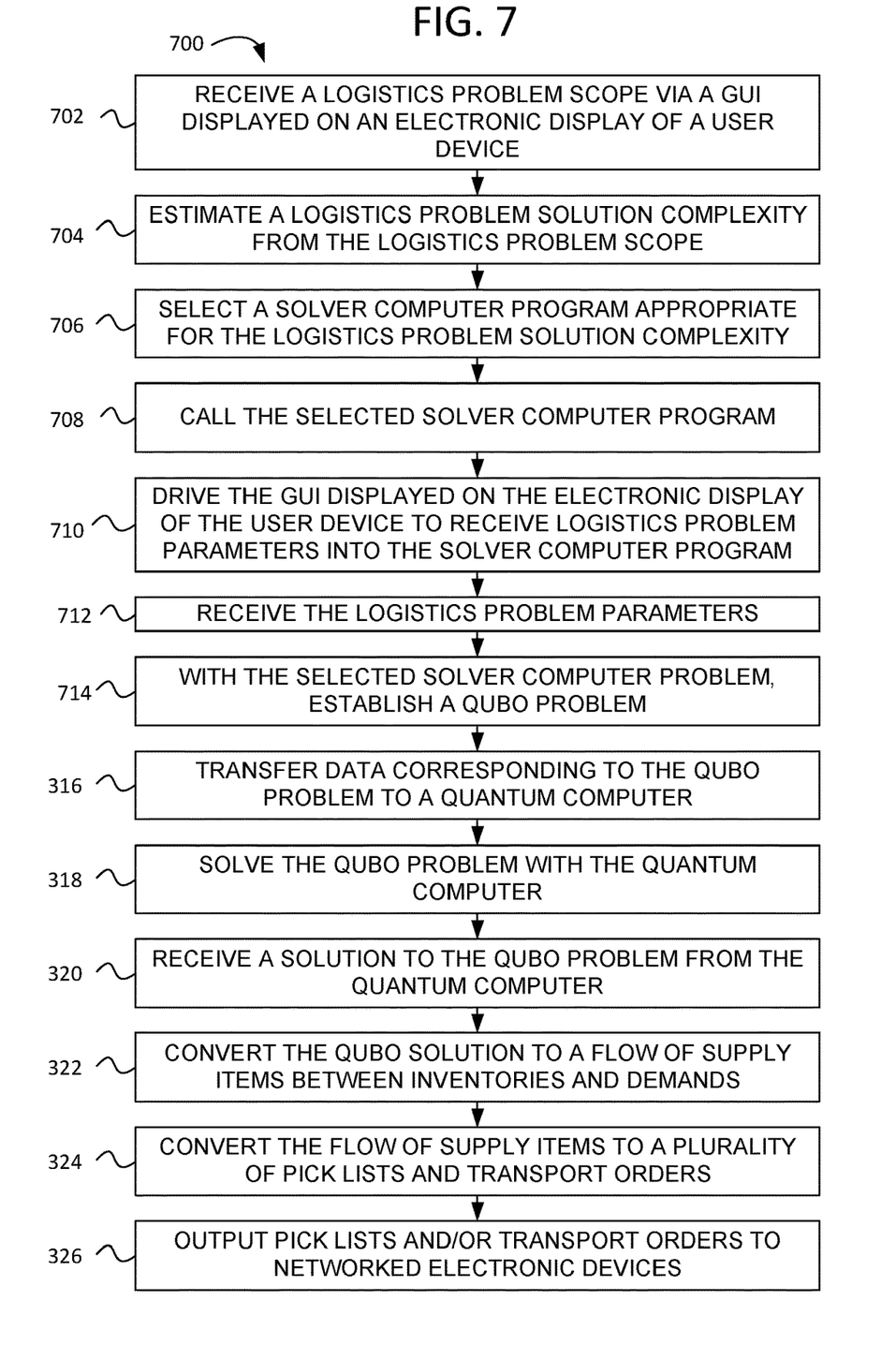
FIG. 7 is a flow chart illustrating a computer method for using a quantum or quantum-inspired computer for solving a constrained logistics optimization problem, according to an embodiment.

FIG. 7 is a flow chart illustrating a computer method 700 for using a quantum or quantum-inspired computer for solving a constrained logistics optimization problem, according to an embodiment. The method 700 includes, in step 702, receiving a logistics problem scope from a user via a graphical user interface displayed on an electronic display of a networked user computing device into a server computer. Proceeding to step 704, the server computer estimates a logistics problem solution complexity corresponding to the logistics problem based on the logistics problem scope. Step 706 includes, with the server computer, selecting a solver computer program appropriate for the logistics problem solution complexity. Step 708 includes calling the selected solver computer program and, in step 710, driving the graphical user interface displayed on the electronic display of the networked user computing device to receive logistics problem parameters into the solver computer program.

Proceeding to step 712 the logistics problem parameters are received. In step 714, with the selected solver computer program, a QUBO problem is established. The method 700 may proceed according to remaining steps described in conjunction with FIGS. 3 and 4. Step 316 includes transferring, to a quantum or quantum-inspired computer or computer array, data corresponding to the QUBO problem. Step 320 includes receiving, from the selected quantum or quantum-inspired computer or computer array into the server computer, a solution to the QUBO problem. Step 322 includes converting, in the server computer, the QUBO solution to a flow of supply items by transforming a plurality of solution binary values into corresponding flows of real supply items, followed by step 324, wherein the flow of supply items is converted to a plurality of pick lists for transport from the inventory locations to the demand locations. In step 326, at least one of the plurality of pick lists and delivery routes is outputted via a GUI on an electronic display on at least one of a plurality of networked devices. Additionally or alternatively, it will be understood that an alternative to outputting pick lists on an electronic display may include driving automated picking and packing equipment.

Figure 8:
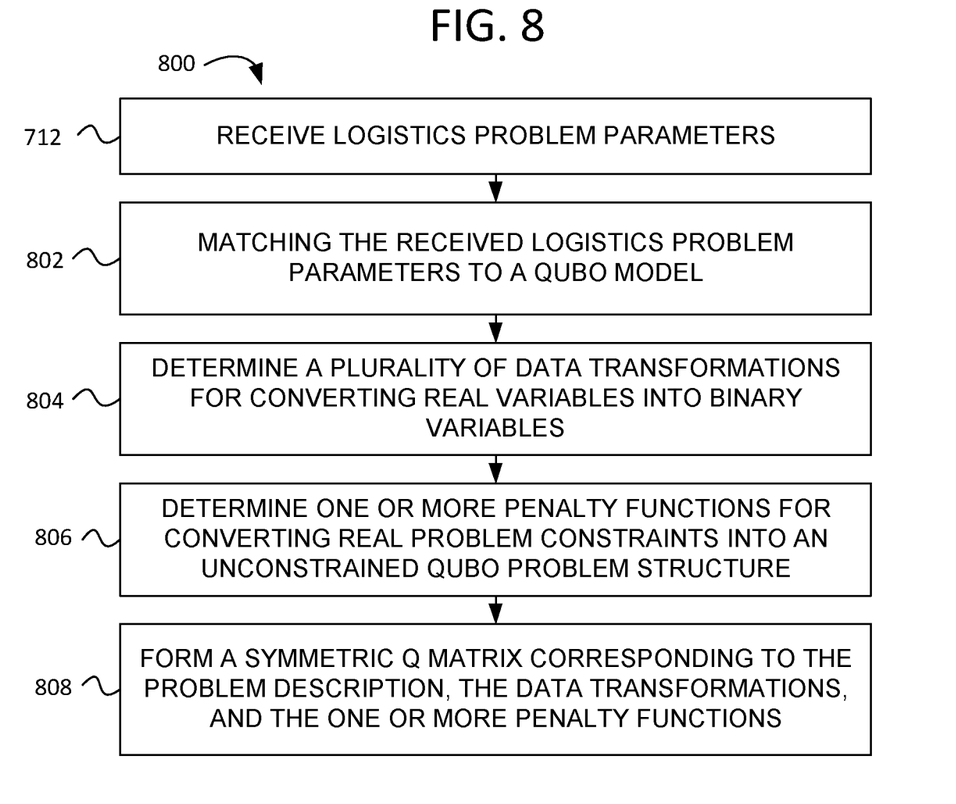
FIG. 8 is a flow chart illustrating a computer method 800 for establishing a QUBO problem, according to an embodiment.

FIG. 8 is a flow chart illustrating a computer method 800 for establishing a QUBO problem, according to an embodiment. Establishing the QUBO problem in step 714 may include, in step 802, matching the problem parameters to a QUBO model. Matching the problem parameters to a QUBO model in step 802 may include matching the problem to a Quadratic Assignment Problem (QAP). Step 804 includes determining a plurality of data transformations for converting real variables into binary variables. Step 806 includes determining one or more quadratic penalty functions corresponding to one or more constraints on delivery of the supply items from the inventory locations to the demand locations, the penalty function being selected to make a quadratic binary optimization problem unconstrained. In step 808, the solver computer program forms a symmetric Q matrix corresponding to the QUBO model, the plurality of data transformations, and the one or more penalty functions.

Calling the selected solver computer program may includes transmitting the problem description to a second server computer for running the selected solver computer program. In this case, establishing a QUBO problem includes receiving the QUBO problem from the second server computer as output from the selected solver computer program.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for managing a supply chain, comprising the steps of:
   receiving, into a server computer, an inventory of one or more supply items located at each of a plurality of different inventory locations;
   receiving into the server computer, a demand for the one or more supply items corresponding to each of a plurality of different demand locations;
   obtaining, with the server computer, map data corresponding to delivery routes between the plurality of different inventory locations and the plurality of different demand locations;
   establishing, with the server computer, a Quadratic Unconstrained Binary Optimization (QUBO) problem comprising the inventory of supply items at the plurality of different inventory locations, the demand at each of the plurality of different demand locations, and the map data, to solve for a flow of the one or more supply items therebetween;
   transferring, to a quantum computer, data corresponding to the QUBO problem;

receiving, from the quantum computer into the server computer, a solution to the QUBO problem;

converting, in the server computer, the solution to the QUBO problem to a flow of supply items by transforming a plurality of solution binary values into corresponding flows of real supply items;

converting, in the server computer, the flow of supply items to a plurality of pick lists for transport from the plurality of different inventory locations to the plurality of different demand locations; and enabling to output, via a graphical user interface (GUI) on an electronic display on at least one of a plurality of networked devices, at least one of the plurality of pick lists and delivery routes.

2. The computer method for managing a supply chain of claim 1, further comprising:
receiving a problem description;
matching the problem description to a QUBO model; and
fetching a template corresponding to the QUBO model from a non-transitory computer readable storage memory.

3. The computer method for managing a supply chain of claim 2, further comprising:
driving the GUI to present prompting or a form, the prompting or form comprising objects for receiving entries of objects, actions, relationships, variables, constraints, and objectives of the problem.

4. The computer method for managing a supply chain of claim 2, wherein matching the problem to a QUBO solution model comprises matching the problem to a model type corresponding to a Quadratic Assignment Problem (QAP).

5. The computer method for managing a supply chain of claim 1, further comprising:
receiving, into the server computer via the GUI, a command to run a previously defined problem description.

6. The computer method for managing a supply chain of claim 1, further comprising:
running the computer method responsive to a specified schedule for running a previously defined problem description to account for changing conditions.

7. The computer method for managing a supply chain of claim 1, wherein the computer method comprises:
receiving an implied command via the GUI on the electronic display of a networked device to commence an optimization of supply item delivery;
wherein receiving the inventory of and the demand for the one or more supply items into the server computer comprises reading values from a non-transitory computer readable storage medium responsive to receiving the implied command.

8. The computer method for managing a supply chain of claim 1, wherein the steps of receiving the inventory of one or more supply items, receiving the demand for one or more supply items and obtaining map data corresponding to delivery routes comprise:
receiving, into the server computer from a webserver computer operatively coupled to one or more internetworks, a plurality of published values comprising at least one of the group consisting of: supply item inventories corresponding to demands, map data, inventory locations, demand locations, costs, prices, storage environmental capability, cartage environmental capability, transport instance designations, transport instance locations, supply location mobility, demand location mobility, and metadata corresponding to one or more groups of persons intended to receive at least a portion of the supply items.

9. The computer method for managing a supply chain of claim 1, wherein the steps of receiving the inventory of one or more supply items, receiving the demand for one or more supply items and obtaining map data corresponding to delivery routes comprise:
enabling a search engine to search published variables comprising inventory, transportation, cache, and/or demand, and locations corresponding thereto;
receiving a hit from the search as a website or web application presented by a hosting computer;
receiving a designation, from a GUI or by analyzing with artificial intelligence, of useful hits;
reading the useful hits; and
maintaining a dynamic listing of the variables in a non-transitory computer readable medium.

10. The computer method for managing a supply chain of claim 9, wherein reading useful hits comprises obtaining data via an FTP transfer.

11. The computer method for managing a supply chain of claim 9, wherein reading useful hits comprises performing screen scraping.

12. The computer method for managing a supply chain of claim 1, wherein establishing the QUBO problem further comprises:
establishing, with the server computer, a real-to-binary conversion value corresponding to supply item flow between the plurality of different inventory locations and the plurality of different demand locations to produce each of a plurality of binary variables selected to represent states of supply item flow for matrix processing by a quantum computer.

13. The computer method for managing a supply chain of claim 12, wherein establishing a real-to-binary conversion value comprises receiving an entry via the GUI.

14. The computer method for managing a supply chain of claim 12, wherein establishing a real-to-binary conversion value comprises establishing the real-to-binary conversion value to equal a package quantity for the one or more supply items.

15. The computer method for managing a supply chain of claim 1, wherein establishing the QUBO problem further comprises:
establishing, with the server computer, a quadratic penalty function corresponding to at least one constraint on delivery of the one or more supply items from the plurality of different inventory locations to the plurality of different demand locations, the quadratic penalty function being selected to make a quadratic binary optimization problem unconstrained.

16. The computer method for managing a supply chain of claim 1, wherein establishing the QUBO problem comprises assigning constants in a square matrix corresponding to at least one quadratic penalty function.

17. The computer method for managing a supply chain of claim 1, wherein establishing the QUBO problem comprises formulating a quadratic assignment problem (QAP).

18. The computer method for managing a supply chain of claim 1, further comprising:
solving, with the quantum computer, the QUBO problem corresponding to the transferred data, wherein solving the QUBO problem with the quantum computer comprises solving the QUBO problem with a quantum annealing computer.

19. The computer method for managing a supply chain of claim 1, further comprising:
solving, with the quantum computer, the QUBO problem corresponding to the transferred data, wherein solving the QUBO problem with the quantum computer comprises solving the QUBO problem with a digital annealing computer.

20. The computer method for managing a supply chain of claim 1, further comprising:

solving, with the quantum computer, the QUBO problem corresponding to the transferred data, wherein solving the QUBO problem with the quantum computer comprises solving the QUBO problem with an adiabatic optimization computer.

21. A non-transitory computer-readable medium carrying computer instructions to execute steps to:

receiving, into a server computer, an inventory of one or more supply items located at each of a plurality of different inventory locations;

receiving into the server computer, a demand for the one or more supply items corresponding to each of a plurality of different demand locations;

obtaining, with the server computer, map data corresponding to delivery routes between the plurality of different inventory locations and the plurality of different demand locations;

establishing, with the server computer, a Quadratic Unconstrained Binary Optimization (QUBO) problem comprising the inventory of supply items at the plurality of different inventory locations, the demand at each of the plurality of different demand locations, and the map data, to solve for a flow of the one or more supply items therebetween;

transferring, to a quantum computer, data corresponding to the QUBO problem;

receiving, from the quantum computer into the server computer, a solution to the QUBO problem;

converting, in the server computer, the solution to the QUBO problem to a flow of supply items by transforming a plurality of solution binary values into corresponding flows of real supply items;

converting, in the server computer, the flow of supply items to a plurality of pick lists for transport from the plurality of different inventory locations to the plurality of different demand locations; and outputting, via a GUI on an electronic display on at least one of a plurality of networked devices, at least one of the plurality of pick lists and delivery routes.

22. A computer method for managing a supply chain, comprising the steps of:

receiving, into a server computer, an inventory of one or more supply items located at each of a plurality of different inventory locations;

receiving into the server computer, a demand for the one or more supply items corresponding to each of a plurality of different demand locations;

obtaining, with the server computer, map data corresponding to delivery routes between the plurality of different inventory locations and the plurality of different demand locations;

establishing, with the server computer, a Quadratic Unconstrained Binary Optimization (QUBO) problem comprising the inventory of supply items at the plurality of different inventory locations, the demand at each of the plurality of different demand locations, and the map data, to solve for a flow of the one or more supply items therebetween;

transferring, to a quantum computer, data corresponding to the QUBO problem;

receiving, from the quantum computer into the server computer, a solution to the QUBO problem;

converting, in the server computer, the solution to the QUBO problem to a flow of supply items by transforming a plurality of solution binary values into corresponding flows of real supply items;

converting, in the server computer, the flow of supply items to a plurality of pick lists for transport from the plurality of different inventory locations to the plurality of different demand locations; and outputting, via a GUI on an electronic display on at least one of a plurality of networked devices, at least one of the plurality of pick lists and delivery routes.

* * * * *

UNITED STATES PATENT AND TRADEMARK OFFICE
CERTIFICATE OF CORRECTION

| | | |
|---|---|---|
| PATENT NO. | : 12,367,458 B2 | Page 1 of 1 |
| APPLICATION NO. | : 18/250040 | |
| DATED | : July 22, 2025 | |
| INVENTOR(S) | : Jason Turner et al. | |

It is certified that error appears in the above-identified patent and that said Letters Patent is hereby corrected as shown below:

On the Title Page

Under Item "(73) Assignees:", please change "Miami, LA (US);" to --Miami, FL (US);--.

Signed and Sealed this
Fourteenth Day of October, 2025

John A. Squires
*Director of the United States Patent and Trademark Office*